United States Patent
Menke

[11] Patent Number: 5,992,919
[45] Date of Patent: Nov. 30, 1999

[54] CABLE DRIVE FOR MOTOR-VEHICLE SLIDING DOOR

[75] Inventor: Johannes-Theodor Menke, Velbert, Germany

[73] Assignee: Kiekert AG, Heiligenhaus, Germany

[21] Appl. No.: 09/071,405

[22] Filed: May 1, 1998

[30] Foreign Application Priority Data

Jun. 28, 1997 [DE] Germany .......................... 197 27 603

[51] Int. Cl.⁶ .......................................... B60J 5/06
[52] U.S. Cl. ............................................. 296/155; 49/360
[58] Field of Search .............................. 296/155; 49/360, 49/153, 158; 254/331, 280, 288, 327, 362; 242/484.1

[56] References Cited

U.S. PATENT DOCUMENTS

| | | | |
|---|---|---|---|
| 5,025,591 | 6/1991 | Deland et al. ........................... | 49/360 |
| 5,063,710 | 11/1991 | Schap ...................................... | 49/280 |
| 5,155,937 | 10/1992 | Yamagishi et al. ................... | 49/360 X |
| 5,168,666 | 12/1992 | Koura et al. ............................ | 49/360 |
| 5,323,570 | 6/1994 | Kuhlman et al. ........................ | 49/360 |
| 5,536,061 | 7/1996 | Moore et al. ............................ | 296/155 |
| 5,746,025 | 5/1998 | Shimura .................................. | 49/360 |
| 5,876,087 | 3/1999 | Kleefeldt et al. ....................... | 296/155 |

*Primary Examiner*—D. Glenn Dayoan
*Assistant Examiner*—Chad D Wells
*Attorney, Agent, or Firm*—Herbert Dubno; Andrew Wilford

[57] ABSTRACT

A cable drive for a motor-vehicle sliding door has a pair of cable sections of predetermined diameter and each having one end attached to the vehicle and an opposite end, a pin fixed on the vehicle, defining an axis, and having a screwthread of a pitch at least equal to the cable diameter, and a gear having a core threaded onto the pin. A pair of coaxial drums having smooth outer surfaces are axially coupled to but rotatable on the core and are each connected to a respective one of the opposite ends of the cable sections. A spring is engaged between and urges the drums rotationally oppositely to tension the cable sections. Interengaging formations on the gear and on the drums rotationally couple the drums to the gear and a reversible drive motor coupled to the gear simultaneously rotates the gear about the axis, axially displaces the gear on the pin, winds up one of the cable sections on the surface of the respective drum, and unwinds the other of the cable sections from the surface of the respective drum.

19 Claims, 5 Drawing Sheets

CABLE DRIVE FOR MOTOR-VEHICLE SLIDING DOOR

FIELD OF THE INVENTION

The present invention relates to a motor-vehicle sliding door. More particularly this invention concerns a cable drive for opening and closing such a door.

BACKGROUND OF THE INVENTION

A standard motor-vehicle sliding door moves on tracks between a closed position and an open position. It is now standard to provide a drive for power-assisted and even remote operation of this door, which under the best of circumstances can be difficult to manipulate.

In a standard arrangement a pair of cable sections, which may be separate or parts of a common cable, each have one end anchored on the door and an opposite end anchored on a respective drum. The drums are coaxially mounted on a common drive pin and are biased in angularly opposite directions by a spring connected between them to keep the cable sections taut. A drive gear rotated by a reversible electrical motor can engage one or the other of the coaxial drums, depending on whether the door is to be opened or closed, to rotate the two drums, paying the cable off one of them and winding it up on the other.

To preserve the cable each of the drums is formed with a helical groove intended to receive the respective cable section when it is wound thereon. It is important that the cable wind up smoothly, without turns one atop the other, so that the cable itself does not chafe and in order to maintain the assembly as compact as possible.

The problem with this arrangement is that the drums are fairly expensive to manufacture, mainly due to formation of the helical cable-seat groove. In addition the cable is pulled at an angle at least toward the end of a windup operation, so it is fairly common for the cable to jump out of its groove and ride up on previously laid turns, causing a chafing problem and possibly leading to binding of the drum due to its increased diameter.

OBJECTS OF THE INVENTION

It is therefore an object of the present invention to provide an improved cable drive for a motor-vehicle sliding door.

Another object is the provision of such an improved cable drive for a motor-vehicle sliding door which overcomes the above-given disadvantages, that is which ensures that the cable will be wound up in a single layer of turns on the drums.

SUMMARY OF THE INVENTION

A cable drive for a motor-vehicle sliding door has according to the invention a pair of cable sections of predetermined diameter and each either having one end attached to the vehicle or a common center portion connected to the door and an opposite end, a pin fixed on the vehicle, defining an axis, and having a screwthread of a pitch at least equal to the cable diameter, and a main gear having a core threaded onto the pin. A pair of coaxial drums having smooth outer surfaces are axially coupled to but rotatable on the core and are each connected to a respective one of the opposite ends of the cable sections. A spring is engaged between and urges the drums rotationally oppositely to tension the cable sections. Interengaging formations on the gear and on the drums rotationally couple the drums to the gear and a reversible drive motor coupled to the gear simultaneously rotates the gear about the axis, axially displaces the gear on the pin, winds up one of the cable sections on the surface of the respective drum, and unwinds the other of the cable sections from the surface of the respective drum.

With this system, therefore, the drums travel axially as they rotate, automatically forming neatly aligned adjacent turns of the cable section being wound up and smoothly paying out the cable being unwound. In fact the point at which the cables tangent the respective drums will not move at all during the winding and unwinding operations so that the cable sections can be accommodated easily in a very narrow guide.

The cable sections in accordance with the invention can be separate with their one ends fixed at separate respective locations to the vehicle. In this case respective rollers are provided on the door over which the cable sections pass. Alternately the cable sections are parts of a single cable having a central part constituting the one ends and connected to the door.

The axis of the threaded pin according to the invention is vertical and the gear is underneath the drums. A spring can be provided for urging the drums axially down against the gear. In addition or alternately a snap ring seated in the core above the drums serves an upper abutment for the drums which therefore are captured axially on the core between the gear and the snap ring.

Both outer surfaces in accordance with the invention are cylindrical and of substantially the same diameter. One of the drums is formed of an inner sleeve extending along the core inside the other of the drums and an outer sleeve defining the respective outer surface and forming with the inner sleeve an annular compartment open toward the other drum. The spring is a torsion spring set in the compartment and having one end seated in the one drum and another end seated in the other drum.

The inner sleeve extending along the core inside the other of the drums and the other drum are formed with radially alignable and radially throughgoing notches and the core is formed with an outwardly projecting lug received with angular play in the notches. The lug and notches constitute the formations.

Outer ends of the drums are formed with radially outwardly projecting flanges. In addition according to the invention the drive motor is provided with an axially elongated drive gear meshing with the main gear that can have end flanges limiting axial travel of the drums and the main gear. Position detecting switches engageable with and operable by the drums or gear in end positions thereof are connected to a controller that operates the motor on detection of travel of the drums or gear into their end positions.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
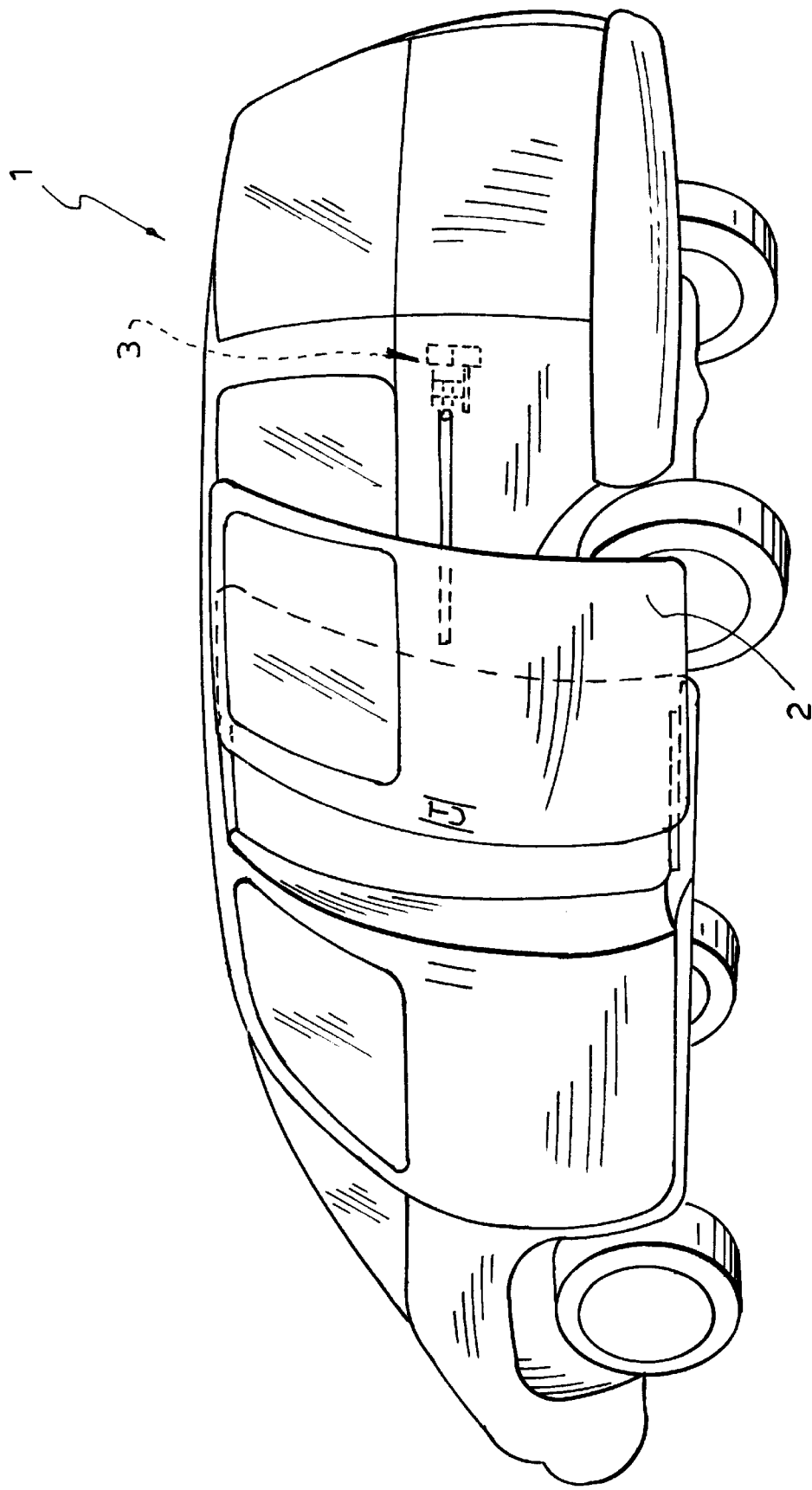
FIG. 1 is a small-scale perspective view of a vehicle equipped with a sliding door according to the invention.
Figure 2:
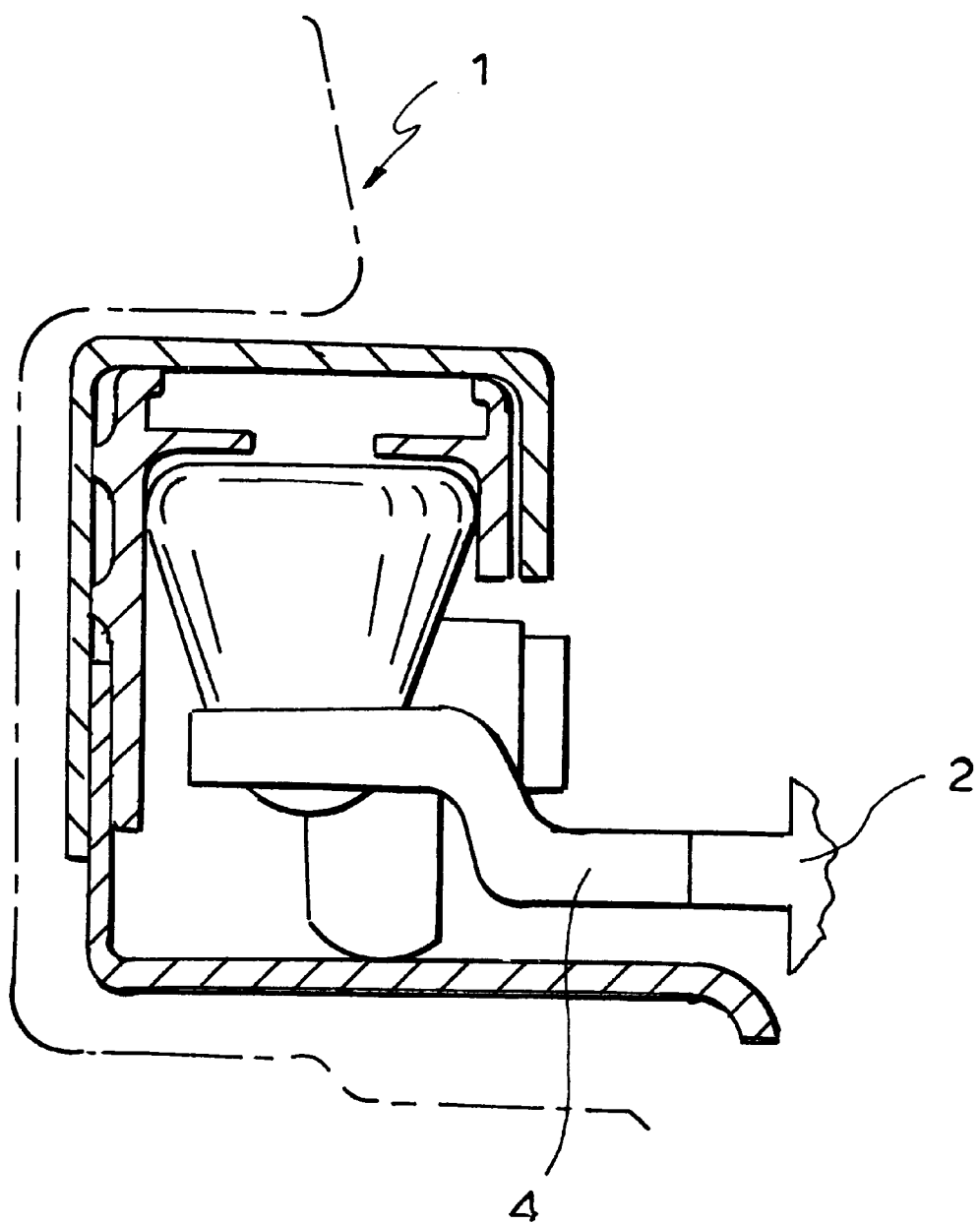
FIG. 2 is a large-scale cross section through door guide/support.
Figure 3:
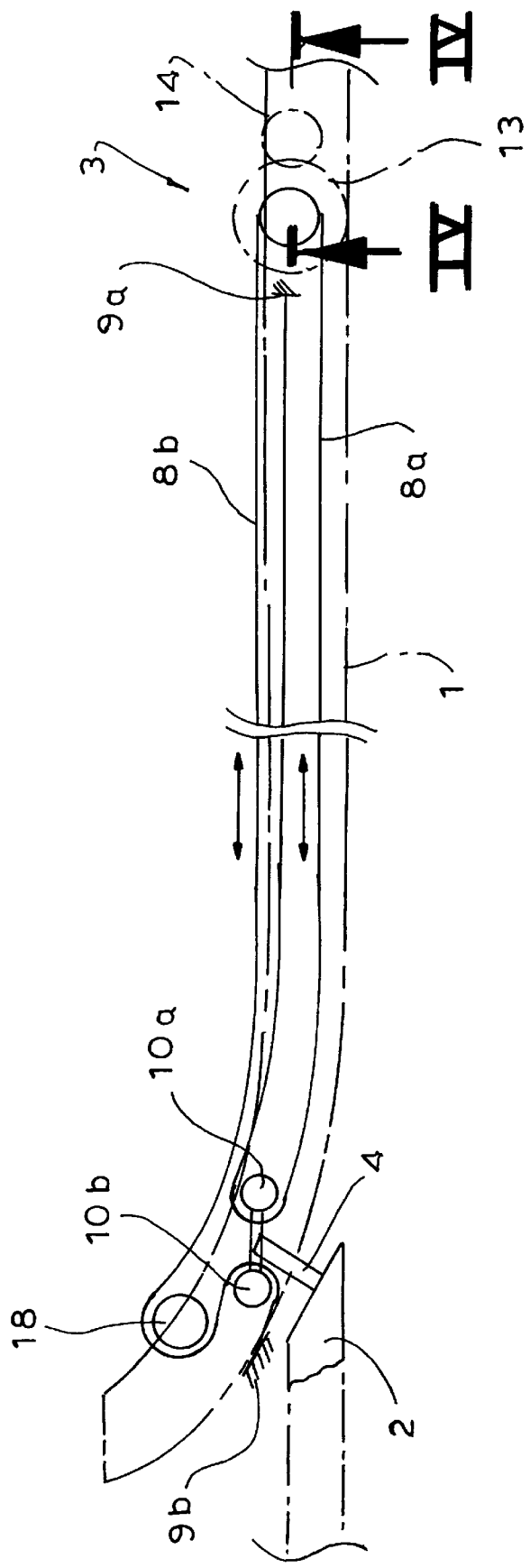
FIG. 3 is a schematic top view illustrating the cable drive of this invention.
Figure 4:
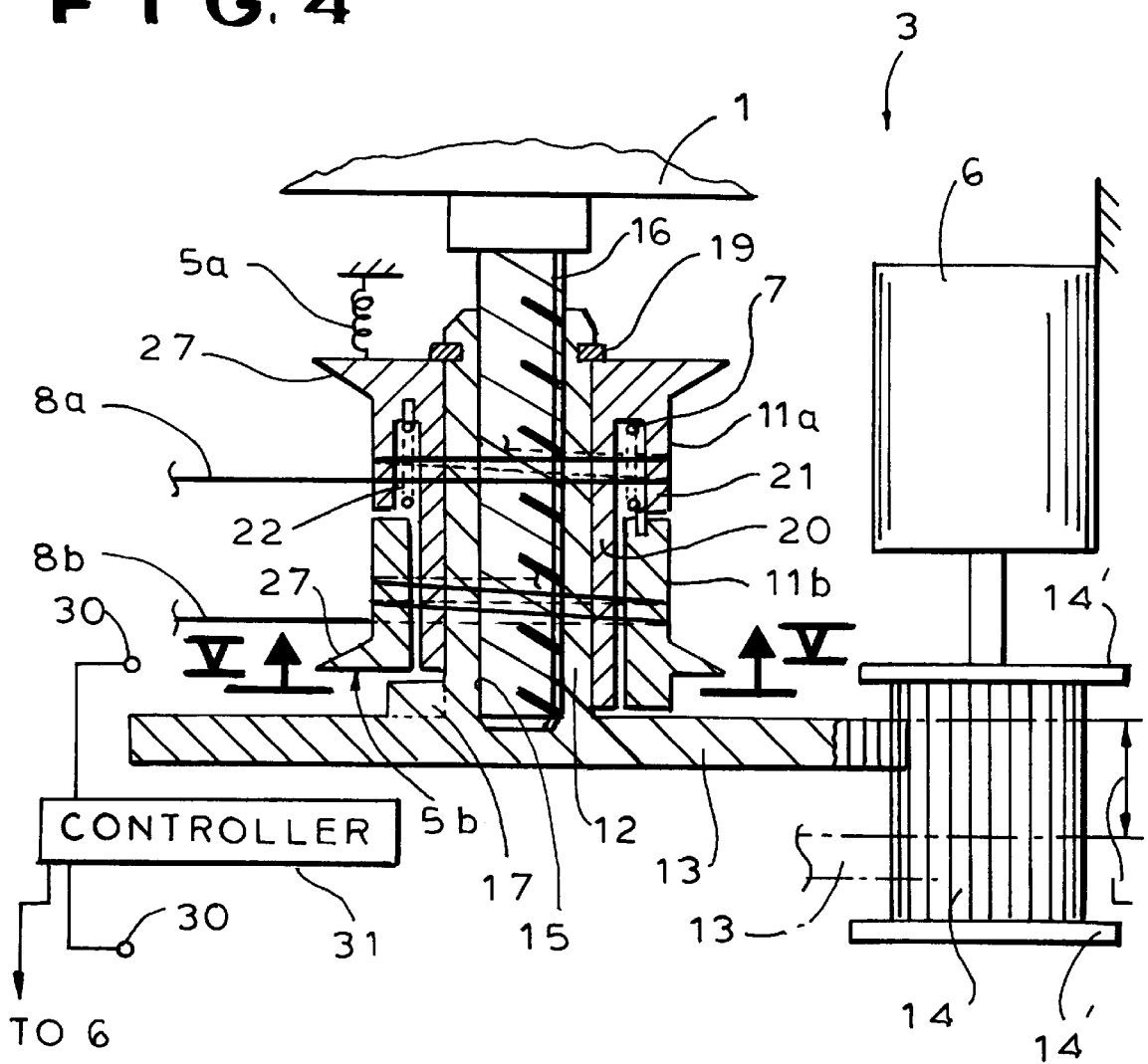
FIG. 4 is a large-scale section taken along line IV—IV of FIG. 3.
Figure 6:
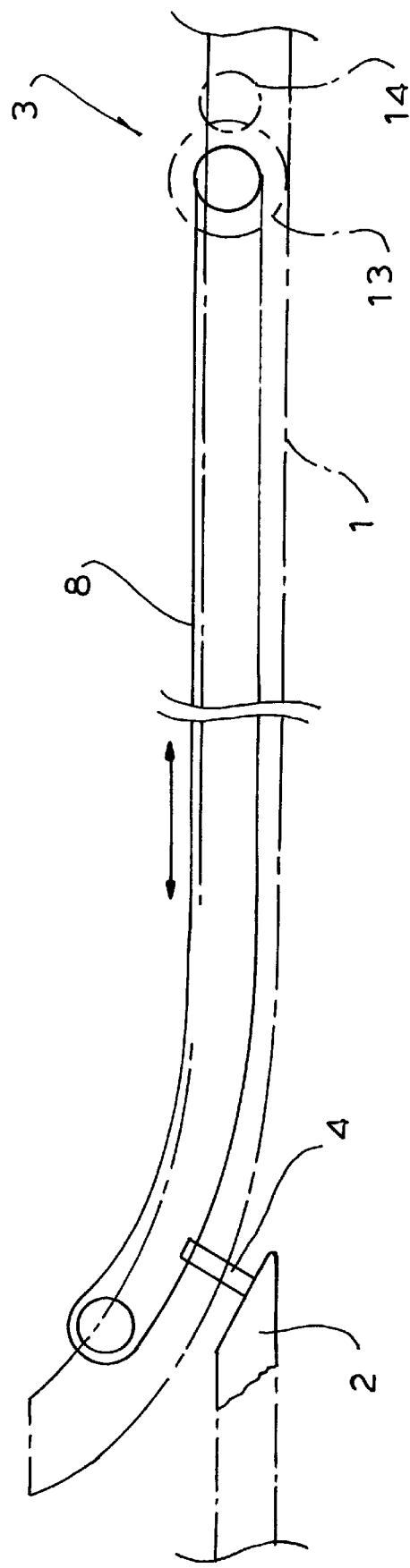
FIG. 6 is a view like FIG. 3 of an alternative cable drive according to the invention.

As seen in FIGS. 1 through 3, a motor vehicle 1 is provided with a sliding door 2 operated by a drive shown generally at 3. The door 2 has a central arm 4 received in a guide rail 28 of the type described in commonly owned patent application Ser. No. 08/831,981. The drive 3 pays out and winds back a pair of cable sections 8a and 8b having ends 9a and 9b anchored on the vehicle 1 and opposite ends anchored on coaxial drums 5a and 5b coupled together by a torsion spring 7 and rotated by a motor 6 about a vertical axis A. The cable section 8b passes around an idler roller 18 mounted on the vehicle 1 and both sections 8a and 8b pass around wheels 10a and 10b mounted on the arm 4. In FIG. 6 a single cable 8 is provided both of whose ends are anchored on the arm 4.

The drums 5a and 5b according to the invention have radially outwardly projecting end flanges 27 and are coaxial to the vertical axis A defined by a threaded pin 16 fixed on the motor-vehicle body 1 and extending substantially perpendicular to the cable sections 8a and 8b. The drum 5a has a cylindrically tubular inner sleeve 20 that rides on a tubularly cylindrical core 12 of a large-diameter gear 13 having a threaded bore 15 screwed onto the pin 16. The drum 5b in turn rides on the center sleeve 20 and the drum 5a has an outer sleeve 21 defining with its inner sleeve 20 an annular compartment 22 holding the torsion spring 7 whose one end is seated in the drum 5a and whose other end is seated in the drum 5b. The drums 5a and 5b have identical smooth cylindrical outer surfaces 11a and 11b on which the respective cable sections 8a and 8b can wind up. A snap ring 19 holds the drums 5a and 5b on the core 12 against axial movement relative thereto. In addition or alternately a spring such as shown schematically at 29 may urge the upper drum 5a down against the lower drum 5b and urge it down against the gear 13.

Figure 5:
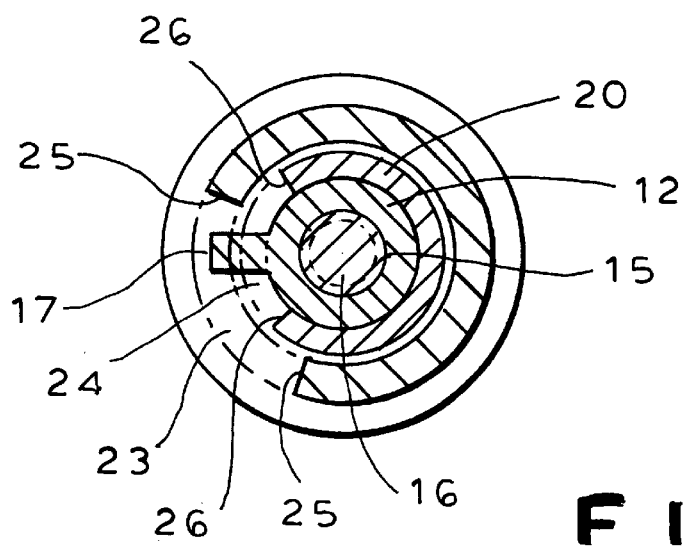
FIG. 5 is a section taken along line V—V of FIG. 4.

The gear 13 is formed with a radially projecting entrainment lug 17 and the drum 5b and the inner sleeve 20 are formed with radially open notches 23 and 24 having end faces 25 and 26 that can angularly engage this lug 17 as shown in FIG. 5. The tension in the spring 7 is such that normally the lug 17 only engages one of the surface 25 or one of the surfaces 26.

The gear 13 meshes with an axially long gear 14 carried by the motor 6. In addition the pitch of the screwthread of the pin 16 is generally least equal to the diameter of the cable forming the sections 8a and 8b. Thus as the motor 6 rotates the gear 14 which in turn rotates the gear 13 and both the drums 5a and 5b, the entire drum assembly formed by both the drums 5a and 5b and by the gear 13 will move axially through a stroke L which is substantially shorter than the length of the gear 14. The gear 14 may be formed with end flanges such as shown at 14' to limit the axial travel of the gear 13. The cable sections 8a and 8b will therefore wind up on the surfaces 11a and 11b in adjacent turns in a single layer.

End switches such as shown schematically at 30 may be operated by the gear 13 and are connected to a controller 31 that stops the drive motor 6 when the gear 13 reaches end positions. The axial or vertical position of the gear 13 is directly related to the horizontal position of the door 2, so that these switches 29 can indicate the open or closed position of the door 2.

I claim:

1. In a motor vehicle having a sliding door, a cable drive comprising:
   a pair of cable sections of predetermined diameter and each having one end attached to the vehicle and an opposite end;
   a pin fixed on the vehicle and defining an axis, the pin having a screwthread of a pitch at least equal to the cable diameter;
   a main gear having a core threaded onto the pin;
   a pair of coaxial drums having smooth outer surfaces, axially coupled to and rotatable on the core, and each connected to a respective one of the opposite ends of the cable sections;
   a spring engaged between the coaxial drums and urging them rotationally oppositely to tension the cable sections;
   interengaging formations on the gear and on the drums rotationally coupling the drums to the gear; and
   means including a reversible drive motor coupled to the gear for simultaneously rotating the gear about the axis, axially displacing the gear on the pin, winding up one of the cable sections on the surface of the respective drum, and unwinding the other of the cable sections from the surface of the respective drum.

2. The motor-vehicle sliding-door drive defined in claim 1 wherein the means includes a relatively long drive gear meshing with the main gear.

3. The motor-vehicle sliding-door drive defined in claim 1 wherein the cable sections are separate and their one ends are fixed at separate respective locations to the vehicle.

4. The motor-vehicle sliding-door drive defined in claim 1, further comprising
   respective rollers on the door over which the cable sections pass.

5. The motor-vehicle sliding-door drive defined in claim 1 wherein the axis is vertical and the gear is underneath the drums.

6. The motor-vehicle sliding-door drive defined in claim 5, further comprising
   spring means urging the drums axially down against the gear.

7. The motor-vehicle sliding-door drive defined in claim 5, further comprising
   a snap ring seated in the core above the drums, the drums being captured axially on the core between the gear and the snap ring.

8. The motor-vehicle sliding-door drive defined in claim 1 wherein both outer surfaces are cylindrical and of substantially the same diameter.

9. The motor-vehicle sliding-door drive defined in claim 8 wherein one of the drums is formed of an inner sleeve extending along the core inside the other of the drums and an outer sleeve defining the respective outer surface and forming with the inner sleeve an annular compartment open toward the other drum, the spring being a torsion spring set in the compartment and having one end seated in the one drum and another end seated in the other drum.

10. The motor-vehicle sliding-door drive defined in claim 8 wherein one of the drums is formed of an inner sleeve extending along the core inside the other of the drums, the inner sleeve and the other drum being formed with radially alignable and radially throughgoing notches and the core being formed with an outwardly projecting lug received with angular play in the notches, the lug and notches constituting the formations.

11. The motor-vehicle sliding-door drive defined in claim 8 wherein the drums have outer ends remote from each other formed with radially outwardly projecting flanges.

12. The motor-vehicle sliding-door drive defined in claim 1 wherein the drive motor is provided with an axially elongated drive gear meshing with the main gear, the drive gear having end flanges limiting axial travel of the drums and the main gear.

13. The motor-vehicle sliding-door drive defined in claim 1, further comprising position detecting switches engageable with and operable by the drums or gear in end positions thereof; and control means connected to the switches for operating the motor on detection of travel of the drums or gear into their end positions.

14. In a motor vehicle having a sliding door, a cable drive comprising:

a single cable sections of predetermined diameter and having a central portion attached to the door and opposite ends;

a pin fixed on the vehicle and defining an axis, the pin having a screwthread of a pitch at least equal to the cable diameter;

a main gear having a core threaded onto the spin;

a pair of coaxial drums having smooth outer surfaces, axially coupled to and rotatable on the core, and each connected to a respective one of the opposite ends of the cable sections;

a spring engaged between the coaxial drums and urging them rotationally oppositely to tension the cable sections;

interengaging formations on the gear and on the drums rotationally coupling the drums to the gear; and means including a reversible drive motor coupled to the gear for simultaneously rotating the gear about the axis, axially displacing the gear on the pin, winding up one of the cable sections on the surface of the respective drum, and unwinding the other of the cable sections from the surface of the respective drum.

15. The motor-vehicle sliding-door drive defined in claim 14 wherein the means includes a relatively long drive gear meshing with the main gear.

16. The motor-vehicle sliding-door drive defined in claim 14, further comprising respective rollers on the door over which the cable sections pass.

17. The motor-vehicle sliding-door drive defined in claim 14 wherein the axis is vertical and the gear is underneath the drums.

18. The motor-vehicle sliding-door drive defined in claim 14, further comprising spring means urging the drums axially down against the gear.

19. The motor-vehicle sliding-door drive defined in claim 14 wherein both outer surfaces are cylindrical and of substantially the same diameter, one of the drums being formed of an inner sleeve extending along the core inside the other of the drums and an outer sleeve defining the respective outer surface and forming with the inner sleeve an annular compartment open toward the other drum, the spring being a torsion spring set in the compartment and having one end seated in the one drum and another end seated in the other drum.

* * * * *